(12) United States Patent
Lau et al.

(10) Patent No.: US 7,027,162 B2
(45) Date of Patent: Apr. 11, 2006

(54) SYSTEM AND METHOD FOR THREE-DIMENSIONAL MEASUREMENT

(76) Inventors: Kam C. Lau, 12700 Greenbriar Rd., Potomac, MD (US) 20854; Yuanqun Liu, 13905 Mustang Hill La., N. Potomac, MD (US) 20878

( * ) Notice: Subject to any disclaimer, the term of this patent is extended or adjusted under 35 U.S.C. 154(b) by 0 days.

(21) Appl. No.: 11/203,782

(22) Filed: Aug. 15, 2005

(65) Prior Publication Data
US 2006/0033931 A1 Feb. 16, 2006

Related U.S. Application Data

(60) Provisional application No. 60/601,831, filed on Aug. 16, 2004.

(51) Int. Cl.
*G01B 9/02* (2006.01)
(52) U.S. Cl. .................................... 356/498
(58) Field of Classification Search ............... 356/482, 356/491, 492, 493, 496, 498, 508, 510
See application file for complete search history.

(56) References Cited

U.S. PATENT DOCUMENTS

| | | | |
|---|---|---|---|
| 3,738,754 A * | 6/1973 | Marcy et al. | 356/498 |
| 6,285,456 B1 * | 9/2001 | Narumi | 356/497 |
| 6,677,565 B1 * | 1/2004 | Wahl et al. | 250/201.3 |
| 2005/0157310 A1 * | 7/2005 | Kim et al. | 356/510 |

* cited by examiner

*Primary Examiner*—Gregory J. Toatley, Jr.
*Assistant Examiner*—Michael A. Lyons
(74) *Attorney, Agent, or Firm*—Bruce E. Weir

(57) ABSTRACT

An optical measurement system increases the number of translational and angular measurements made with a single laser beam by combining an optical interferometer with an optical autocollimator. Translational measurements are made with an optical interferometer and yaw and pitch measurements are made with an autocollimator. In a preferred embodiment, angular deviations in the reflected measuring beam are minimized with a reverse telescopic lens assembly, allowing a wider range of angular measurements without significant degradation of interferometer accuracy.

11 Claims, 3 Drawing Sheets

SYSTEM AND METHOD FOR THREE-DIMENSIONAL MEASUREMENT

CROSS-REFERENCES TO RELATED APPLICATIONS

This application is related to U.S. Pat. No. 4,714,339, entitled "Three and Five Axis Laser Tracking Systems" and issued Dec. 22, 1987; U.S. Pat. No. 6,049,377, entitled "Five-Axis/Six-Axis Laser Measuring System" and issued Apr. 11, 2000; U.S. Pat. App. Pub. No. U.S. 2003/0043362 A1, entitled "Six Dimensional Laser Tracking System and Method" and published Mar. 6, 2003; U.S. Pat. App. Pub. No. U.S. 2003/020685 A1, entitled "Nine Dimensional Laser Tracking System and Method" and published Nov. 6, 2003. The present application claims the benefit of Provisional Application No. 60/601,831, entitled "System and Method for Three-Dimensional Measurement" and filed Aug. 16, 2004. The present application hereby incorporates by reference all above-referenced patents and patent applications in their entirety.

BACKGROUND

Rapid, precise measurement of the position and orientation of a tool or workpiece is critical to many automated manufacturing processes. Although a variety of different measurement systems have been developed, optical measuring systems have proven precise, adaptable, reliable, and relatively inexpensive.

Most optical measuring systems exploit various effects obtained by manipulating the output of low-intensity lasers. For example, highly accurate linear distance measurements can be obtained by counting interference fringes that shift position as a laser beam reflects from a shifting target. Such a system may be initially calibrated by measuring the time of flight of a laser pulse that strikes a target and returns to a source.

Orientation measurements have posed more of a challenge, since, for example, a light beam parallel to a rotational axis of a target may register no distance variation. One solution to this problem utilizes the polarizing effects of a Glan-Thompson prism, which resolves an incoming laser beam into two orthogonal vector components that vary in intensity according to the rotational orientation of the prism with respect to the beam. Once such a system is calibrated, a target's angle of rotation about an axis may be calculated from the measured intensity differential between output vector components.

However, obtaining complete positional data for a target using the simplest forms of such measurement techniques may require a separate distance-measuring system for each translational axis and a separate rotation-measuring system for each rotational axis. As the setup and operation of simple multi-dimensional measurement systems may become cumbersome and expensive, it is highly desirable to make as many different but simultaneous measurements as possible with a single light beam.

SUMMARY

The present invention increases the number of translational and angular measurements made with a single laser beam by combining an optical interferometer with an optical autocollimator. This system and method provides both a precise linear distance measurement on one translational axis and simultaneous yaw and pitch measurements. Utilizing a single laser beam, a translational measurement is made with an optical interferometer and angular measurements are made with an autocollimator. In a preferred embodiment, angular deviations in the reflected measuring beam are minimized with a reverse telescopic lens assembly, allowing a wider range of angular measurements without significant degradation of interferometer accuracy. All of these features and advantages of the present invention, and more, are illustrated below in the drawings and detailed description that follow.

DETAILED DESCRIPTION

Figure 1:
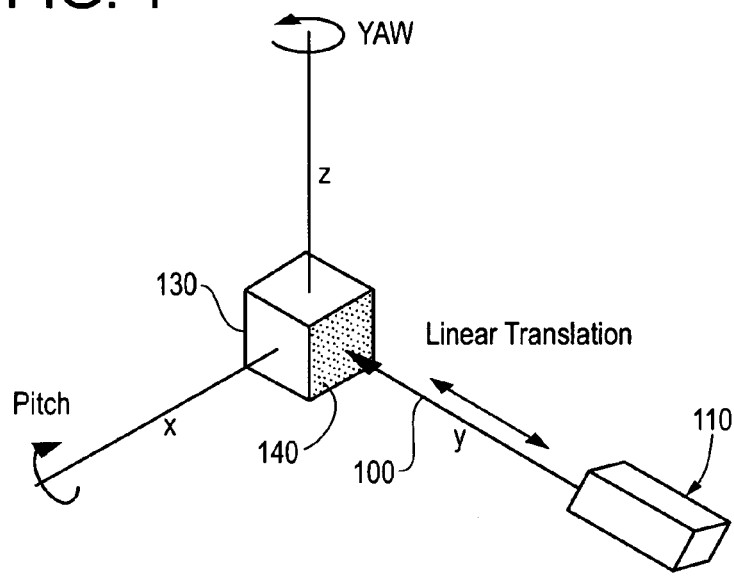
FIG. 1 shows the present invention's axes of measurement.

The present invention combines an optical interferometer with an optical autocollimator to measure a target's linear translation in one dimension and rotational orientation in two dimensions with a single low-intensity laser beam. As shown in FIG. 1, linear translation of an object 130 along the y-axis may be measured by an optical interferometer 110 that directs a light beam 100 against a reflective surface 140.

Figure 2:
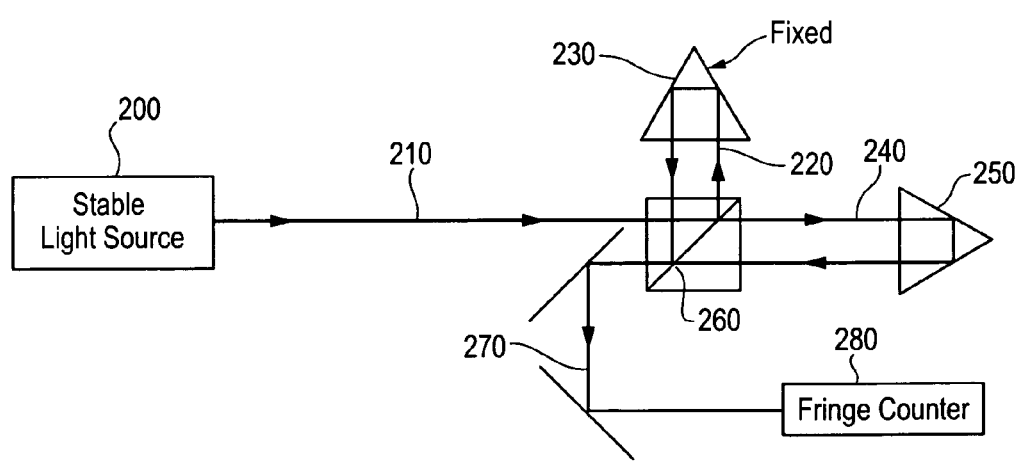
FIG. 2 shows a diagram of a typical optical interferometer.

FIG. 2 shows a diagram of a typical optical interferometer. A stable light source 200 emits a coherent light beam 210 that impinges upon a beam splitter 260 as is known in the art. A reference portion 220 of the light beam 210 is directed to a fixed reference reflector 230 and returned to the beam splitter 260. A target portion 240 of the light beam 210 passes through the beam splitter 260 to impinge upon a target reflector 250. The target reflector 250 may be a flat reflector, retroreflector, or other suitable reflector affixed directly or indirectly to a surface or object having its linear translation measured. The target portion 240 of the light beam is returned from the target reflector 250 to the beam splitter 260 to be recombined with the reference portion 220 of the light beam 210.

The position of the reference reflector 230 is fixed with respect to the beam splitter 260, so linear translation of the target reflector 250 along the axis of the beam causes a phase shift between the target beam 240 and the reference beam 220. Resulting interference within the recombined beam 270 produces minima and maxima that are sensed by a fringe counter 280 as the target reflector 250 translates on the axis of measurement. The positional change of the target reflector 250 may be calculated from the number of fringes sensed by the fringe counter 280.

Figure 3:
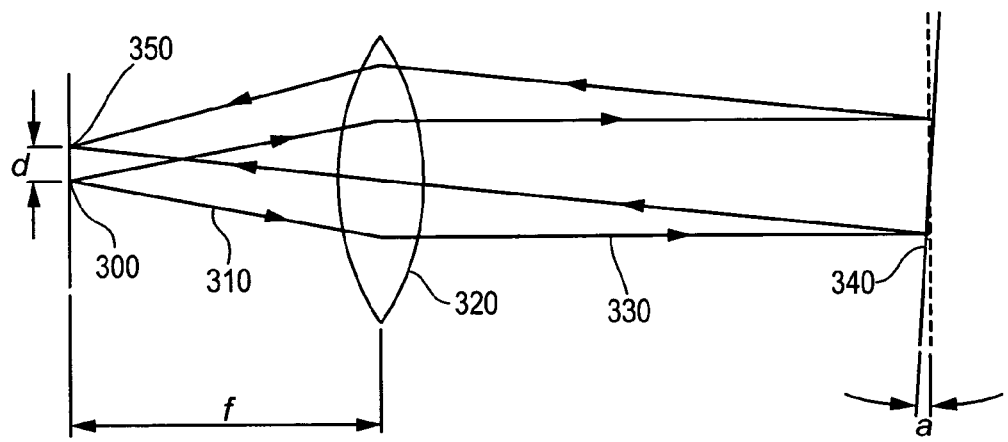
FIG. 3 shows a simplified diagram of an autocollimator.

FIG. 3 depicts the operation of a generalized autocollimation device utilizing light from a point source. Light rays 310 from a light source 300 are refracted by a lens 320 into a collimated beam 330 comprising parallel rays. The collimated beam 330 is reflected by a flat reflector 340 back through the lens 320, which focuses the collimated beam 330 to a receiving point 350 on the plane of the light source 300. If the collimated beam 330 is orthogonal to the flat reflector 340, the receiving point 350 will coincide with the light source 300. However, if the flat reflector 340 is angled with respect to the collimated beam 330, the receiving point 350 will shift with respect to the light source 300 a distance d. For small angles (where tan(2a) is approximately equal to 2a), the slant angle a in radians of the flat reflector 340 may be calculated as a=d/2f where f is the focal length of the lens 320.

Figure 4:
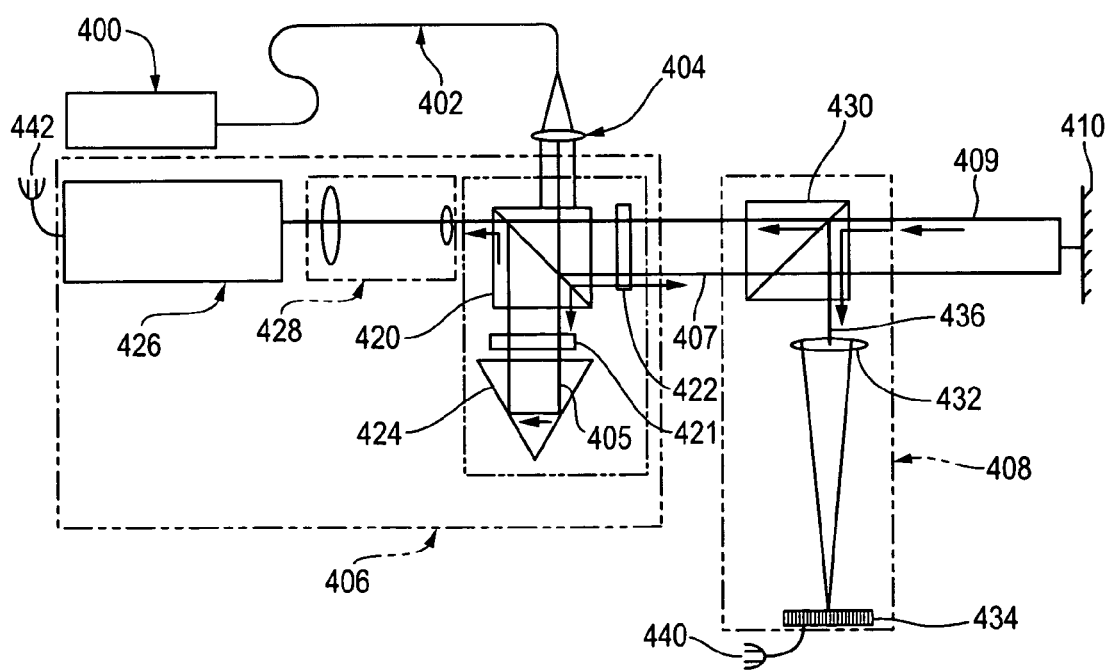
FIG. 4 shows a schematic view of a preferred embodiment of the present invention, including an optical interferometer, an autocollimator, and a reverse telescopic lens assembly.

The present invention places both an interferometer and an autocollimator in the same beam path, allowing measurement of pitch, yaw, and linear translation with a single beam. FIG. 4 shows a schematic view of a preferred embodiment of the present invention that combines an interferometer and an autocollimator. An HeNe or other laser 400 as is known in the art emits a beam containing at least two orthogonally polarized components. Output from the laser 400 is conducted by a Polarization Maintaining (PM) fiber 402 to a lens 404 that directs the beam into an interferometer 406. The PM fiber allows isolation of the laser 400 from the measuring apparatus, reducing extraneous heat and vibration that may degrade measurement accuracy. The preferred interferometer of the present invention comprises a polarizing beam splitter 420, quarter-wave retardation plates 421, 422, a fixed retroreflector 424, and a fringe counter 426, as are all known in the art. The preferred embodiment may also comprise a reverse telescopic lens assembly 428.

As previously described, a light beam directed into the interferometer is divided by the polarizing beam splitter 420 into a reference beam 405 and an outgoing target beam 407. The outgoing target beam 407 passes through a quarter-wave retardation plate 422 and an autocollimator 408 comprising a beam splitter 430, a lens 432, and a detector 434. The outgoing target beam 407 initially passes through the beam splitter 430 and strikes a flat reflective target surface 410, from which a return target beam 409 is reflected back through the beam splitter 430. The target 410 is typically a flat mirror, although corner reflectors and other known specular reflectors may be used.

Although FIG. 4 depicts outgoing and return target beams as traveling separate paths for clarity, both travel the same path when the target surface 410 is orthogonal to the outgoing target beam 407. The beam splitter 430 directs an autocollimator portion 436 of the return target beam 409 through a lens 432 that focuses the autocollimator portion 436 of the beam onto a detector 434. The detector 434 generates an output signal corresponding to the location of the focused beam on the detector surface that is communicated via a serial connector 440 or other data connector known in the art to a computer (not shown). A typical detector 434 would utilize a lateral effect photodiode. An alternate embodiment of the present invention may utilize a dual-axis lateral effect photodiode such as an SC/10 from United Detector Technology. A dual-axis photodiode provides two output signals which together measure in two lateral dimensions where on the photodiode focused beam strikes.

Since the autocollimator portion 436 of the beam enters the autocollimator 408 as an undiffused laser beam, the preferred autocollimator 408 of FIG. 4 is simplified in comparison with the generalized autocollimation device of FIG. 3. No return reflection path is required within the autocollimator 408 to collimate the autocollimator portion 436 of the beam. No point source is needed to establish a zero-deviation point. Instead, any point on the detector 434 may be arbitrarily designated as a zero-deviation point.

When the reflective target surface 410 is orthogonal to the outgoing target beam 407, the autocollimator portion 436 of the beam is orthogonal to the outgoing target beam 407 and focused on a zero-deviation point on the detector 434. Reorientations of the reflective target surface 410 corresponding to changes in the pitch or yaw of the surface cause the focal point of the autocollimator portion 436 of the reflected beam to shift across the surface of the detector 434, allowing measurement of the amount of shift and calculation of the pitch and yaw angles. The output voltage signal from the detector 434 is converted to digital form by an A/D converter for transmission to a computer.

The remainder of the return target beam 409 returns to the interferometer beam splitter 420 to be recombined with the reference beam 405 and directed into the fringe counter 426 for measurement of linear translation of the reflective target surface 410. Fringe counters known in the art typically generate an averaged output signal from an array of detectors (not shown) corresponding to movement of minima and maxima across the detectors. The present invention may utilize any suitable fringe counter known in the art. The fringe counter output signal is communicated via a serial connector 442 or other data connector known in the art to a computer (not shown). The present invention may additionally be equipped with time-of-flight detectors as are known in the art to initially establish the absolute distance between the present invention and the target reflector.

Changes in the pitch or yaw of the reflective target surface 410 cause the return target beam 409 to shift across the fringe counter detector arrays, introducing measurement errors and, with a sufficient shift, directing the return target beam 409 away from the array altogether. A preferred embodiment of the present invention introduces a reverse telescopic lens assembly 428 into the return target beam 409 path between the polarizing beam splitter 420 and the fringe counter 426. The reverse telescopic lens assembly 428, which is essentially a reversed telescope as is known in the art, reduces the angle of deviation of the return target beam 409 by the reciprocal of assembly's magnification, so that a 10× telescopic array would reduce a 10 second deviation to a 1 second deviation. This reduction advantageously allows measurement of significantly larger changes in pitch and yaw while still allowing accurate linear translation measurements. Placement of the reverse telescopic lens assembly 428 between the polarizing beam splitter 420 and the fringe counter 426 advantageously allows the reduction of interferometric error without affecting autocollimator 408 operation.

Figure 5:
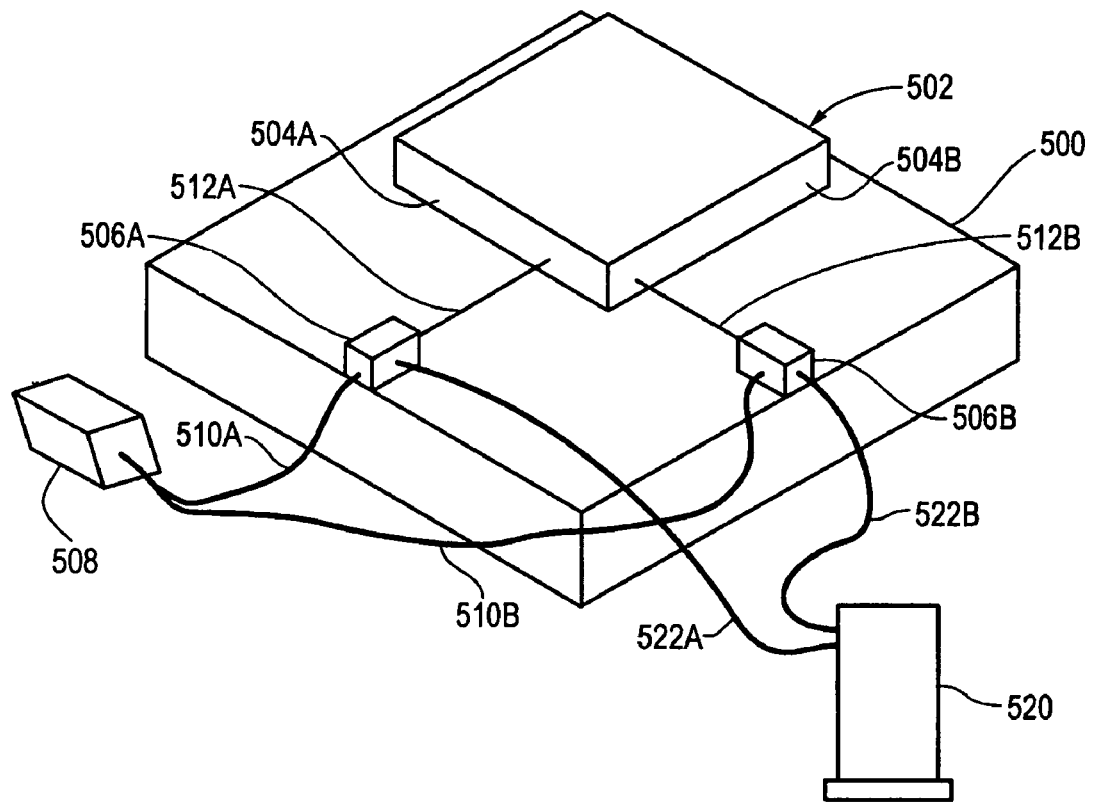
FIG. 5 shows a typical measurement setup utilizing two modules of the present invention.

FIG. 5 depicts an application of the present invention. A platform 502 with mirrored surfaces 504A, 504B moves upon a base 500. The position of an object (not shown) mounted upon the platform 502 may be measured and calculated as the platform 502 moves. A laser 508 supplies light through PM fibers 510A, 510B to measuring devices 506A, 506B embodying the present invention. The measuring devices 506A, 506B may be mounted on the base 500 or on fixtures within line-of-sight of the platform 502. Preferentially, the laser beams 512A, 512B projected by the measuring devices 506A, 506B are mutually orthogonal. Data cables 522A, 522B transmit the outputs of both the fringe counters and the autocollimator detectors in each measuring device 506A, 506B device to a computer 520.

As the platform 502 moves upon the base 500, the interferometric components of each measuring device respond to translational movement on the x and y axes, with one measuring device 506A measuring translation along the x-axis while the other measuring device 506B measuring translation along the y-axis. Rotation of the platform 502 about the z-axis (yaw) causes the reflected laser beams 512A, 512B to shift direction, in turn causing the autocollimator portions of these beams to shift across the autocollimator detector surface within each measuring device 506A, 506B. The resulting output signals are processed within a computer 520 utilizing hardware and software disclosed in the applicant's previous patents and patent applications and/or well-known in the art to calculate, store, display, and/or output changes in platform 502 position and orientation. Both measuring devices can measure yaw, although autocollimator detector output from one would ordinarily be selected. If the platform 502 is rotated out of the plane of the base 500, one measuring device 506A can measure roll while the other measuring device 506B can measure pitch.

An additional interferometer (not shown) with a beam parallel to the z-axis could be added to measure translation along the z-axis. With suitable components, the present invention can measure translational movement of one nanometer and angular changes of $\frac{1}{100}$ of a second of arc.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

We claim:

1. A measurement device, comprising:
   an interferometer, the interferometer comprising a polarizing first beam splitter, a first quarter-wave retardation plate, a second quarter-wave retardation plate, a reflector, and a fringe counter, the interferometer capable of receiving a radiation beam, the radiation beam comprising a first beam component and a second beam component, the first beam component having a first polarization and the second beam component having a second polarization, the second polarization orthogonal to the first polarization;
   an autocollimator, the autocollimator comprising a second beam splitter, a first lens, and a detector, the detector having at least a first sensing surface;
   the first beam splitter reflecting an outgoing target portion of the first beam component through the first quarter-wave retardation plate and the second beam splitter to impinge upon a planar reflecting target, the target reflecting a return target portion of the first beam component back to the second beam splitter, the second beam splitter reflecting an autocollimator portion of the return target portion of the first beam component through the first lens, the first lens focusing the autocollimator portion of the return target portion of the first beam component onto a point on the first sensing surface, the detector generating a first output signal corresponding the location of the point on the first sensing surface;
   the second beam splitter, the first quarter-wave retardation plate, and the first beam splitter transmitting an interferometer portion of the return target portion of the first beam component to the fringe counter; and
   the first beam splitter and the second quarter-wave retardation plate transmitting the second beam component to the reflector, the reflector reflecting the second beam component back through the second quarter-wave retardation plate to impinge on the first beam splitter, the first beam splitter reflecting the second beam component to the fringe counter while merging the second beam component with the interferometer portion of the return target portion of the first beam component, the fringe counter generating a second output signal in response to interference between the interferometer portion of the return target portion of the first beam component and the second beam component.

2. A measurement system as claimed in claim 1, further comprising a reverse telescopic assembly, the reverse telescopic assembly interposed between the first beam splitter and the fringe counter, the reverse telescopic assembly reducing angular deviations in at least the interferometer portion of the return target portion of the first beam component resulting from changes in the orientation of the target.

3. A measurement system, comprising:
   a laser capable of emitting a radiation beam, the radiation beam comprising a first beam component and a second beam component, the first beam component having a first polarization and the second beam component having a second polarization, the second polarization orthogonal to the first polarization;
   a target capable of reflecting at least a portion of the radiation beam;
   an interferometer, the interferometer comprising a polarizing first beam splitter, a first quarter-wave retardation plate, a second quarter-wave retardation plate, a reflector, and a fringe counter, the interferometer receiving the radiation beam from the laser;
   an autocollimator, the autocollimator comprising a second beam splitter, a first lens, and a detector, the detector having at least a first sensing surface;
   the first beam splitter reflecting an outgoing target portion of the first beam component through the first quarter-wave retardation plate and the second beam splitter to impinge upon the target, the target reflecting a return target portion of the first beam component back to the second beam splitter, the second beam splitter reflecting an autocollimator portion of the return target portion of the first beam component through the first lens, the first lens focusing the autocollimator portion of the return target portion of the first beam component onto a point on the first sensing surface, the detector generating a first output signal corresponding the location of the point on the first sensing surface;
   the second beam splitter, the first quarter-wave retardation plate, and the first beam splitter transmitting an interferometer portion of the return target portion of the first beam component to the fringe counter;
   the first beam splitter and the second quarter-wave retardation plate transmitting the second beam component to the reflector, the reflector reflecting the second beam component back through the second quarter-wave retardation plate to impinge on the first beam splitter, the first beam splitter reflecting the second beam component to the fringe counter while merging the second beam component with the interferometer portion of the return target portion of the first beam component, the fringe counter generating a second output signal in response to interference between the interferometer portion of the return target portion of the first beam component and the second beam component;
   computation means for computing changes in target orientation from the first output signal and translational movement of the target from the second output signal, and means for transmitting the first output signal and the second output signal to the computation means.

4. A measurement system as claimed in claim 3, further comprising a polarization-maintaining optical fiber and a second lens, the polarization-maintaining optical fiber transmitting the radiation beam from the laser to the second lens, the second lens directing the radiation beam to the first beam splitter.

5. A measurement system as claimed in claim 3, further comprising a reverse telescopic assembly, the reverse telescopic assembly interposed between the first beam splitter and the fringe counter, the reverse telescopic assembly reducing angular deviations in at least the interferometer portion of the return target portion of the first beam component resulting from changes in the orientation of the target.

6. A measurement system, comprising:
a laser capable of emitting a radiation beam, the radiation beam comprising a first beam component and a second beam component, the first beam component having a first polarization and the second beam component having a second polarization, the second polarization orthogonal to the first polarization;
a target capable of reflecting at least a portion of the radiation beam;
an interferometer, the interferometer comprising a polarizing first beam splitter, a first quarter-wave retardation plate, a second quarter-wave retardation plate, a reflector, a reverse telescopic assembly, and a fringe counter, the reverse telescopic assembly interposed between the first beam splitter and the fringe counter;
a polarization-maintaining optical fiber and a first lens, the polarization-maintaining optical fiber transmitting the radiation beam from the laser to the first lens, the first lens directing the radiation beam to the first beam splitter;
an autocollimator, the autocollimator comprising a second beam splitter, a second lens, and a detector, the detector having at least a first sensing surface;
the first beam splitter reflecting an outgoing target portion of the first beam component through the first quarter-wave retardation plate and the second beam splitter to impinge upon the target, the target reflecting a return target portion of the first beam component back to the second beam splitter, the second beam splitter reflecting an autocollimator portion of the return target portion of the first beam component through the second lens, the second lens focusing the autocollimator portion of the return target portion of the first beam component onto a point on the first sensing surface, the detector generating a first output signal corresponding the location of the point on the first sensing surface;
the second beam splitter transmitting an interferometer portion of the return target portion of the first beam component to the first quarter-wave retardation plate, the interferometer portion of the return target portion of the first beam component passing through the first quarter-wave retardation plate, the first beam splitter, and the reverse telescopic assembly to impinge upon the fringe counter, the reverse telescopic assembly reducing angular deviations in at least the interferometer portion of the return target portion of the first beam component resulting from changes in the orientation of the target;
the first beam splitter and the second quarter-wave retardation plate transmitting the second beam component to the reflector, the reflector reflecting the second beam component back through the second quarter-wave retardation plate to impinge on the first beam splitter, the first beam splitter reflecting the second beam component to the fringe counter while merging the second beam component with the interferometer portion of the return target portion of the first beam component, the fringe counter generating a second output signal in response to interference between the interferometer portion of the return target portion of the first beam component and the second beam component;
computation means for computing changes in target orientation from the first output signal and translational movement of the target from the second output signal, and
means for transmitting the first output signal and the second output signal to the computation means.

7. A measurement system, comprising:
means for emitting a coherent light beam;
first splitting means for splitting the coherent light beam into a target beam and a reference beam;
means for reflecting the target beam back to the first splitting means;
second splitting means for reflecting a portion of the reflected target beam to autocollimation means, the autocollimation means producing a first output signal corresponding to angular deviations in the portion of the reflected target beam reflected to the autocollimation means;
means for reflecting the reference beam back to the first splitting means, the first splitting means superposing the reflected reference beam and the reflected target beam to create interference maxima and minima;
means to sense the interference maxima and minima, and to produce a second output signal corresponding to sensed interference maxima and minima; and
computation means for receiving the first and second output signals, and for computing changes in target orientation from the first output signal and translational movement of the target from the second output signal.

8. A measurement system as claimed in claim 7, further comprising polarization maintaining means for transmitting the coherent light beam to the first splitting means.

9. A measurement system as claimed in claim 7, further comprising refracting means for reducing angular deviations in the reflected target beam resulting from changes in the orientation of the means for reflecting the target beam back to the first splitting means.

10. A measurement system, comprising:
means for emitting a coherent light beam;
first splitting means for splitting the coherent light beam into a target beam and a reference beam;
polarization maintaining means for transmitting the coherent light beam to the first splitting means;
means for reflecting the target beam back to the first splitting means;
second splitting means for reflecting a portion of the reflected target beam to autocollimation means, the autocollimation means producing a first output signal corresponding to angular deviations in the portion of the reflected target beam reflected to the autocollimation means;
means for reflecting the reference beam back to the first splitting means, the first splitting means superposing the reflected reference beam and the reflected target beam to create interference maxima and minima;
refracting means for reducing angular deviations in the reflected target beam resulting from changes in the orientation of the means for reflecting the target beam back to the first splitting means;

means to sense the interference maxima and minima, and to produce a second output signal corresponding to sensed interference maxima and minima; and computation means for receiving the first and second output signals, and for computing changes in target orientation from the first output signal and translational movement of the target from the second output signal.

11. A method for measuring the translation and rotation of a target, comprising:

splitting a beam of coherent light into an outgoing target beam and a reference beam;

directing the outgoing target beam to a specularly-reflecting planar target, the outgoing target beam being reflected by the target to become a reflected target beam;

splitting the reflected target beam into a return target beam and an autocollimator beam;

measuring changes in the direction of the autocollimator beam;

generating a first output signal corresponding to measured changes in the direction of the autocollimator beam, transmitting the first output signal to a computer;

superposing the reference beam onto the return target beam to create interference minima and maxima;

sensing the interference minima and maxima with a fringe counter;

generating a second output signal corresponding to interference minima and maxima sensed by the fringe counter, transmitting the second output signal to the computer; and computing changes in target orientation from the first output signal and translational movement of the target from the second output signal.

* * * * *